(12) United States Patent
Koyanagi et al.

(10) Patent No.: US 6,359,667 B1
(45) Date of Patent: Mar. 19, 2002

(54) ORGANOPOLYSILOXANE FINE PARTICLES, PROCESS FOR THE PRODUCTION THEREOF AND LIQUID CRYSTAL DISPLAYS

(75) Inventors: Tsuguo Koyanagi; Michio Komatsu; Kazuhiro Nakayama, all of Kitakyushu (JP)

(73) Assignee: Catalysts & Chemicals Industries Co., Ltd. (JP)

( * ) Notice: Subject to any disclaimer, the term of this patent is extended or adjusted under 35 U.S.C. 154(b) by 0 days.

(21) Appl. No.: 09/601,826

(22) PCT Filed: Jan. 29, 1999

(86) PCT No.: PCT/JP99/00390

§ 371 Date: Aug. 8, 2000

§ 102(e) Date: Aug. 8, 2000

(87) PCT Pub. No.: WO99/40145

PCT Pub. Date: Aug. 12, 1999

(30) Foreign Application Priority Data

Feb. 9, 1998 (JP) ............................. 10-027568
Feb. 9, 1998 (JP) ............................. 10-027569

(51) Int. Cl.$^7$ ............................................ G02F 1/1343
(52) U.S. Cl. ........................... 349/55; 528/21; 528/25; 528/34; 528/39
(58) Field of Search ................................... 349/55; 528/21, 528/39, 34, 25

(56) References Cited

U.S. PATENT DOCUMENTS 5,223,964 A * 6/1993 Nagano et al.

FOREIGN PATENT DOCUMENTS

| JP | 05-105418 A | * | 4/1993 |
| JP | 06250193 | | 9/1994 |
| JP | 07-089711 A | * | 4/1995 |
| JP | 07140472 | | 6/1995 |
| JP | 08-337413 A | * | 12/1996 |
| JP | 09059384 | | 3/1997 |
| JP | 2000-017074 | * | 1/2000 |

* cited by examiner

Primary Examiner—Robert Dawson
Assistant Examiner—Marc S. Zimmer
(74) Attorney, Agent, or Firm—Webb Ziesenheim Logsdon Orkin & Hanson, P.C.

(57) ABSTRACT

An organopolysiloxane fine particle comprising as a principal component a polysiloxane having a hydrocarbon group (a) directly bonded to a silicon atom and having an OH group (b) directly bonded to a silicon atom, wherein:

(i) carbons contained in the hydrocarbon group (a) constitute 5 to 35% of the weight of the organopolysiloxane fine particles, and (ii) the OH group (b) is in an amount of 1 to 8 meq per g of the organopolysiloxane fine particles, the organopolysiloxane fine particles having:

(iii) a 10% compressive modulus of elasticity of 150 to 900 Kg/mm$^2$, (iv) an average compressive deformation $(C_r)^m$ of 20 to 60%, (v) an average elastic recovery $(R_r)^m$ of 60 to 90%, and (vi) an average particle diameter of 0.5 to 50 μm.

With respect to this organopolysiloxane fine particle, besides the requirements (i) to (vi), it is preferred that the statistical dispersion of the 10% compressive modulus of elasticity of the organopolysiloxane fine particle fall in the range ±20% based on an average of the 10% compressive modulus of elasticity.

The produced organopolysiloxane fine particle exhibits a low aggregation ratio and an extremely sharp particle diameter distribution. The compressive modulus of elasticity, elastic recovery and compressive deformation thereof are high, and the statistical dispersion of compressive deformation is small. Moreover, the organopolysiloxane fine particle is excellent in the spreadabillty on a base. Therefore, the organopolysiloxane fine particles are suitable for use as a spacer fine particle to be incorporated in, for example, a liquid crystal cell.

8 Claims, 1 Drawing Sheet

ORGANOPOLYSILOXANE FINE PARTICLES, PROCESS FOR THE PRODUCTION THEREOF AND LIQUID CRYSTAL DISPLAYS

TECHNICAL FIELD

The present invention relates to an organopolysiloxane fine particle, a process for producing the same and a liquid crystal display having the organopolysiloxane fine particles interposed as spacers between liquid crystal cell electrodes thereof. More particularly, the present invention is concerned with an organopolysiloxane fine particle which is excellent in spreadability and elastic properties, a process for producing the same and a liquid crystal display having the organopolysiloxane fine particles interposed as spacers between liquid crystal cell electrodes thereof.

BACKGROUND OF THE INVENTION

It is common practice to interpose a spacer and seal a liquid crystal substance between a pair of electrodes disposed in a liquid crystal cell for liquid crystal display so that a liquid crystal layer is formed therebetween. When the thickness of this liquid crystal layer is not uniform, the image displayed on the liquid crystal cell may suffer from color shading (mottle) and contrast degradation at the time of lighting. Therefore, it is required that the thickness of the liquid crystal layer inside the liquid crystal cell be uniform. Further, when the displayed image is changed over at a high speed or when an image of a large visibility angle is displayed, it is also required that the thickness of the liquid crystal layer inside the liquid crystal cell be uniform.

Still further, for displaying large images free from color shading (mottle) on the currently employed large-scope liquid crystal display of STN mode, there is a greater need to have a uniform thickness of the liquid crystal layer inside the liquid crystal cell.

It is known to interpose, in dispersed form, spherical particles of uniform diameter between electrodes of the liquid crystal cell, namely to employ spherical particles as inter-electrode spacers of the liquid crystal cell, for making the thickness of the liquid crystal layer uniform inside the liquid crystal cell. For example, particles of an organic resin such as polystyrene and fine particles of silica are used as such spherical particles.

However, when particles of an organic resin such as polystyrene are used as the inter-electrode spacers of the liquid crystal cell, the problem is encountered such that the organic resin particles are so soft that it is difficult to maintain the uniformity of the thickness of the liquid crystal layer inside the liquid crystal cell. For example, if nonuniform pressure is applied to the liquid crystal layer inside the liquid crystal cell, the spacers are deformed in accordance with the nonuniformity of the pressure to thereby disenable maintaining the uniformity of the thickness of the liquid crystal layer inside the liquid crystal cell.

On the other hand, in case of fine particles of silica which are used as the inter-electrode spacers of the liquid crystal cell, when silica fine particles do not have a sharp particle diameter distribution, the problem that the thickness of the liquid crystal layer inside the liquid crystal cell is rendered nonuniform because of the smallness of the compressive deformation of the silica fine particles is invited. Furthermore, the problem is invited that, when such a liquid crystal display is exposed to low temperatures, void formation, namely cold (low-temperature) bubbling, occurs between the liquid crystal layer and the electrode of the liquid crystal cell because, inside the liquid crystal cell, the thermal expansion coefficient of the liquid crystal layer is different from that of the spacers.

In an attempt to solve the above problems, Japanese Patent Laid-open Publication No. 6(1994)-250193 proposed using as an inter-electrode spacer of liquid crystal cell silica fine particles prepared by first hydrolyzing a hydrolyzable silicon compound such as tetraethoxysilane to thereby obtain fine particles of silica and thereafter esterifying silanol groups present on silica particle surfaces with an organic compound.

The silica fine particle prepared by this process had appropriate hardness and mechanical recovery and was suitable to an inter-electrode spacer of liquid crystal cell. However, the mechanical recovery thereof was not highly satisfactory for use as an inter-electrode spacer of liquid crystal cell.

These fine particles having commonly been employed as spacer particles are composed of either an organic substance such as polystyrene or an inorganic substance such as silica and are substantially either hydrophobic or hydrophilic. Therefore, some of these fine particles, when to be spread in the wet state on an electrode base, are not monodispersed, depending on the type of solvent, to thereby disenable uniform spreading. Further, some of these fine particle, when to be spread in the dry state on an electrode base, are electrified to thereby disenable uniform spreading and invite such a problem that the fine particles are likely to stick to parts other than the electrode base.

As apparent from the above, even if a spacer fine particle has uniform particle diameters and excellent elastic properties, it may occur that uniform spreading thereof cannot be attained to thereby disenable satisfactory exertion of the effects based on their characteristics.

Japanese Patent Laid-open Publication No. 7(1995)-140472 discloses obtaining a spacer fine particle for liquid crystal cell having a specified compressive modulus of elasticity by subjecting an organosilicon compound of the formula $R'_m Si(OR^2)_{4-m}$ (wherein each of R' and $R^2$ represents a specified organic group, and m is an integer of 0 to 3) to hydrolysis, condensation polymerization and heating at 100 to 1000° C. The compressive modulus of elasticity of the spacer fine particle is controlled by the amount of residual organic groups remaining after the pyrolysis of some of organic groups present in the interior of particles during the heating step.

However, there exists such a problem that, when particle diameters are different from each other, the amount of organic groups remaining in the particle interior after the heating step varies from particle to particle, so that control of the amount of residual organic groups is difficult to thereby increase the statistical dispersion of compressive modulus of elasticity from particle to particle with the result that it is difficult to control the compressive modulus of elasticity of the spacer fine particle for liquid crystal cell by the amount of residual organic groups remaining in the interior of particles. Furthermore, there exists such a problem that not only are the surface and the interior of particles different from each other in the amount of residual organic groups to thereby cause the compressive modulus of elasticity to be non-uniform throughout the whole body of particles, but also, voids occur at organic group portions in the internal part of particles thermally decomposed during the above heating step, with the result that the compressive modulus of elasticity of obtained spacer fine particle for liquid crystal cell is lowered.

Under these circumstances, the inventors found that producing an organopolysiloxane fine particle from an organosilicon compound by a specified process enables controlling the amount of organic groups in the interior of fine particles, even if the above heating step is not implemented, so that an organopolysiloxane fine particle of uniform particle diameter having a high elastic recovery can be obtained. Thus, the inventors made a proposal based on the finding (Japanese Patent Application No. 7(1995)-213800)(Japanese Patent Laid-Open Publication No. 9(1997)-59384).

However, the obtained organopolysiloxane fine particle was hydrophobic, so that it was experienced to be unable to effect uniform spreading thereof on a base, when the obtained organopolysiloxane fine particle was used as an inter-electrode spacer. Therefore, depending on the usage, it was needed to render part of the obtained hydrophobic organopolysiloxane fine particle hydrophilic. This necessitated additional treating steps for rendering the fine particle hydrophilic, etc., and, depending on the treatment, deterioration of the compressive strength of the organopolysiloxane fine particle was experienced.

The present invention has been made with a view toward solving the foregoing problems of the prior art. Therefore, it is an object of the present invention to provide fine particles for spacers which can be uniformly spread on an electrode base, having excellent elastic properties and having uniform particle diameters. It is another object of the present invention to provide a process for producing the spacer fine particle, and it is a further object of the present invention to provide a liquid crystal display having the spacer fine particle interposed as spacer between liquid crystal cell electrodes thereof.

SUMMARY OF THE INVENTION

The organopolysiloxane fine particle of the present invention comprises as a principal component a polysiloxane having a hydrocarbon group (a) directly bonded to a silicon atom and having an OH group (b) directly bonded to a silicon atom, wherein:
  (i) carbons contained in the hydrocarbon group (a) constitute 5 to 35% of the weight of the organopolysiloxane fine particle, and
  (ii) the OH group (b) is in an amount of 1 to 8 meq per g of the organopolysiloxane fine particle,
the organopolysiloxane fine particle having:
  (iii) a 10% compressive modulus of elasticity of 150 to 900 Kg/mm$^2$,
  (iv) an average compressive deformation $(C_r)^m$ of 20 to 60%,
  (v) an average elastic recovery $(R_r)^m$ of 60 to 90%, and
  (vi) an average particle diameter of 0.5 to 50 μm.

The statistical dispersion of the 10% compressive modulus of elasticity of the organopolysiloxane fine particle is preferably in the range of ±20% based on an average of the 10% compressive modulus of elasticity.

A process for producing an organopolysiloxane fine particle according to the present invention comprises the steps of:
  (a) subjecting a mixture of an organosilicon compound of the formula Si(OR$^1$)$_4$ (1) and an organosilicon compound of the formula R'Si(OR$^2$)$_3$ (2) to hydrolysis and condensation polymerization in a solvent of a mixture of water and an organic solvent to thereby obtain a dispersion of seed particles, provided that, in the formulae, each of R$^1$ and R$^2$ represents a hydrogen atom or an organic group having 1 to 10 carbon atoms selected from among an alkyl group, an alkoxyalkyl group and an acyl group, and R' represents an organic group having 1 to 10 carbon atoms selected from among substituted or unsubstituted hydrocarbon groups;
  (b) adding an alkali to the dispersion of seed particles to thereby stabilize the seed particle dispersion;
  (c) adding at least one compound represented by the following formula (3) or (4), optionally together with a compound represented by the following formula (5) while maintaining the seed particle dispersion at a pH of 6 to 9, to the seed particle dispersion and performing a hydrolysis and condensation polymerization thereof so that the seed particles are grown to thereby obtain a spherical fine particle dispersion,

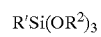

(3)

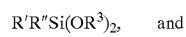

(4)

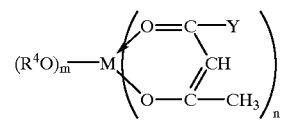

(5)

wherein:
  R$^2$ and R' are as defined above, R" represents an organic group having 1 to 10 carbon atoms selected from among substituted or unsubstituted hydrocarbon groups, R$^3$ represents a hydrogen atom or an organic group having 1 to 10 carbon atoms selected from among an alkyl group, an alkoxyalkyl group and an acyl group, and R$^4$ represents a propyl or butyl group,
  Y represents an organic group selected from among a methyl group, a methoxy group, an ethyl group and an ethoxy group, and M represents an element selected from among those of Groups 2 to 15 of the periodic table, and
  m is an integer of 0 to 3 and n is an integer of 1 to 4, provided that m+n is an integer of 2 to 4;
  (d) heating the spherical fine particle dispersion to thereby effect aging thereof; and
  (e) treating the spherical fine particle in a moist atmosphere at 100 to 600° C.

Another process for producing an organopolysiloxane fine particle according to the present invention comprise the steps of:
  (a) subjecting a mixture of an organosilicon compound of the formula Si(OR$^1$)$_4$ (1) and an organosilicon compound of the formula R'Si(OR$^2$)$_3$ (2) to hydrolysis and condensation polymerization in a solvent of a mixture of water and an organic solvent to thereby obtain a dispersion of seed particles, provided that, in the formulae, each of R$^1$ and R$^2$ represents a hydrogen atom or an organic group having 1 to 10 carbon atoms selected from among an alkyl group, an alkoxyalkyl group and an acyl group, and R' represents an organic group having 1 to 10 carbon atoms selected from among substituted or unsubstituted hydrocarbon groups;
  (b) adding an alkali to the dispersion of seed particles to thereby stabilize the seed particle dispersion;

(c) adding at least one compound represented by the following formula (3) or (4), optionally together with a compound represented by the following formula (5) while maintaining the seed particle dispersion at a pH of 6 to 13, to the seed particle dispersion and performing a hydrolysis and condensation polymerization thereof so that the seed particles are grown to thereby obtain a spherical fine particle dispersion, $$R'Si(OR^2)_3 \tag{3}$$

$$R'R''Si(OR^3)_2, \text{ and} \tag{4}$$

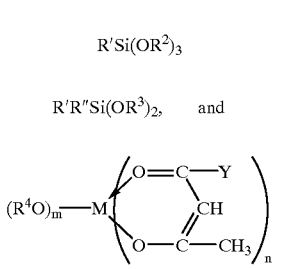 (5)

wherein:
$R^2$ and $R'$ are as defined above, $R''$ represents an organic group having 1 to 10 carbon atoms selected from among substituted or unsubstituted hydrocarbon groups, $R^3$ represents a hydrogen atom or an organic group having 1 to 10 carbon atoms selected from among an alkyl group, an alkoxyalkyl group and an acyl group, and $R^4$ represents a propyl or butyl group, Y represents an organic group selected from among a methyl group, a methoxy group, an ethyl group and an ethoxy group, and M represents an element selected from among those of Groups 2 to 15 of the periodic table, and m is an integer of 0 to 3 and n is an integer of 1 to 4, provided that m+n is an integer of 2 to 4;

(d) heating the spherical fine particle dispersion to thereby effect aging thereof; and (e') heating the spherical fine particle in a nitrogenous basic gas atmosphere.

The liquid crystal display of the present invention comprises a liquid crystal cell fitted with a pair of electrodes between which the above-mentioned organopolysiloxane fine particles are interposed as spacer.

DETAILED DESCRIPTION OF THE INVENTION

Figure 1:
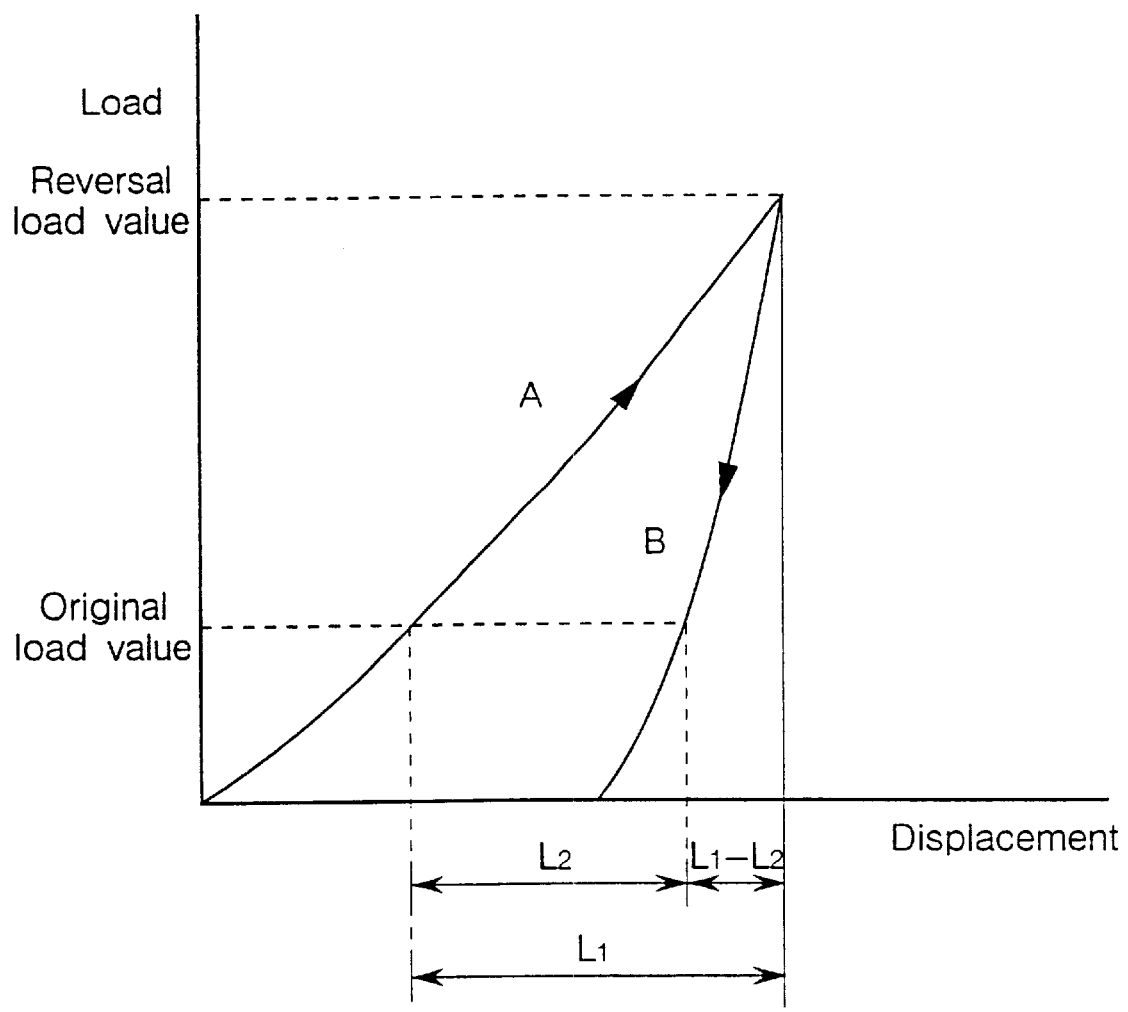
FIG. 1 is a graph of load versus displacement, useful view for explaining the elastic recovery and compressive deformation.

The organopolysiloxane fine particle of the present invention and processes for producing the same is described below.

Organopolysiloxane Fine Particle

First, the organopolysiloxane fine particle of the present invention is described in detail.

The fine particle of the present invention is an organopolysiloxane fine particle comprising as a principal component a polysiloxane having a hydrocarbon group (a) directly bonded to a silicon atom and having an OH group (b) directly bonded to a silicon atom.

The silicon content, in terms of $SiO_2$, of these organopolysiloxane fine particle is preferably in the range of 50 to 90% by weight, still preferably 60 to 80% by weight. The organopolysiloxane constituting this fine particle is presumed as having a three-dimensional network structure based on the ladder structure commonly so termed.

The hydrocarbon group (a) directly bonded to a silicon atom is, for example, a substituted or unsubstituted hydrocarbon group having 1 to 10 carbon atoms.

Examples of suitable unsubstituted hydrocarbon group include an alkyl (chain alkyl or cycloalkyl) group, an alkenyl group, an aralkyl group and an aryl group. The substituted hydrocarbon group is a group obtained by partly or entirely substituting hydrogen atoms of the above unsubstituted hydrocarbon group with nonhydrocarbon groups or elements other than hydrogen. Examples of suitable substituted hydrocarbon groups include $CH_2Cl$, $CH_2F$, γ-methacryloxypropyl, γ-glycidoxypropyl, aminopropyl, 3,4-epoxycyclohexylethyl, γ-mercaptopropyl and trifluoropropyl groups. These hydrocarbon groups (a) are groups attributed to the R' and R" directly bonded to a silicon atom, which constitute part of the organosilicon compound of the formula $R'Si(OR^2)_3$ or $R'R''Si(OR^3)_2$ used as a raw material in the production of the organopolysiloxane fine particle. The organosilicon compound will be described later.

In the organopolysiloxane fine particle of the present invention, the amount of carbon contained in the organic group such as the hydrocarbon group (a) directly bonded to a silicon atom is in the range of 5 to 35% by weight, preferably 10 to 30% by weight.

When the carbon amount is less than 5% by weight, a fine particle having satisfactory elastic properties cannot be obtained. Further, the obtained organopolysiloxane fine particle may be one of low average elastic recovery whose 10% compressive modulus of elasticity, described later, is high over 900 $Kg/mm^2$. On the other hand, when the carbon amount is greater than 35% by weight, the obtained organopolysiloxane fine particle may be one of low average elastic recovery whose 10% compressive modulus of elasticity is lower than 150 $Kg/mm^2$.

In the determination of this carbon amount, it is generally calculated from the amount of R' and R" contained in the organosilicon compound of the formula $R'Si(OR^2)_3$ or $R'R''Si(OR^3)_2$ used as a raw material.

Further, in the present invention, the amount of OH group (b) directly bonded to a silicon atom is in the range of 1 to 8, preferably 2 to 6, meq per g of the organopolysiloxane fine particle.

When the amount of OH group (b) is less than 1 meq/g, the dry spreadability of the fine particle is deteriorated. On the other hand, when the amount of OH group (b) is greater than 8 meq/g, the elastic properties of the fine particle may be unsatisfactory. The amount of OH group (b) is determined by measuring the weight loss of the organopolysiloxane fine particle at 100 to 350° C. with the use of a differential thermal analyzer and making a calculation under the presumption that the weight loss is attributed to the removal of OH groups leading to generation of water.

The 10% compressive modulus of elasticity of the organopolysiloxane fine particle of the present invention is in the range 150 to 900 $Kg/mm^2$, preferably 200 to 700 $Kg/mm^2$.

When the 10% compressive modulus of elasticity is lower than 150 $Kg/mm^2$, the fine particle is so soft that it may be infeasible to uniformly maintain the thickness of the liquid crystal layer in the liquid crystal cell. Further, the pressure on individual particles is decreased to thereby restrict the deformation of the particles, so that it is needed to increase the number of spread particles. As a result, the product quality and productivity may be lowered. On the other hand, when the 10% compressive modulus of elasticity is higher than 900 Kg/mm$^2$, the aforementioned cold bubbling may occur.

Further, in the present invention, it is preferred that the statistical dispersion of the 10% compressive modulus of elasticity of the organopolysiloxane fine particle be in the range of ±20%, especially ±10%, based on an average of the 10% compressive modulus of elasticity. When the statistical dispersion falls outside this range, the degree of deformation under pressure varies from particle to particle. Therefore, the liquid crystal display in which the above fine particle is used as an inter-electrode spacer may suffer from cold bubbling, image shading, contrast deterioration, etc.

The method of evaluating the 10% compressive modulus of elasticity and the statistical dispersion thereof is as follows.

In the measurement of the 10% compressive modulus of elasticity, a micro-compression tester (model MCTM-200 manufactured by Shimadzu Corporation) is used as a measuring instrument. Load is applied to one fine particle of diameter D as a sample at a fixed loading rate to thereby deform the particle until the compression displacement becomes 10% of the particle diameter. At that time, the load and compression displacement (mm) are read. The 10% compressive modulus of elasticity is calculated by substituting the particle diameter and the measured compression load and compression displacement at 10% displacement in the following formula:

$$K = (3/\sqrt{2}) \times F \times S^{-3/2} \times D^{-1/2}$$

wherein,

K: 10% compressive modulus of elasticity (Kg/mm$^2$),

F: compression load (Kg),

S: compression displacement (mm), and

D: particle diameter (mm).

Herein, the 10% compressive modulus of elasticity is determined for each of 10 particles, and an average thereof is calculated to evaluate the 10% compressive modulus of elasticity of the fine particle. The statistical dispersion means the percentage of the remainder of the 10% compressive modulus of elasticity of each individual particle minus the average based on the average.

Further, the average elastic recovery $(R_r)^m$ of the organopolysiloxane fine particle of the present invention is in the range of 40 to 90%, preferably 70 to 90%. When the average elastic recovery is less than 40%, the given liquid crystal layer cannot be maintained at a uniform thickness, and image shading may occur. On the other hand, when the average elastic recovery is higher than 90%, there is such a problem that indication shading is likely to occur, for example, when the liquid crystal display is shocked and vibrated.

Still further, the average compressive deformation $(C_r)^m$ of the organopolysiloxane fine particle of the present invention is in the range of 20 to 60%, preferably 25 to 50%. When the average compressive deformation is less than 20%, the particles are so hard that the aforementioned cold bubbling may occur. On the other hand, when the average compressive deformation is higher than 60%, the particles are so soft that it may be infeasible to uniformly maintain the thickness of the liquid crystal layer in the liquid crystal cell. Moreover, the pressure on individual particles is decreased to thereby restrict the deformation of the particles, so that it is needed to increase the number of spread particles. As a result, the product quality and productivity may be lowered.

The average elastic recovery and the average compressive deformation are determined in the following manner.

Load is applied to one fine particle of diameter D as a sample at a fixed loading rate up to a given load value (reversal load value) by means of the aforementioned micro-compression tester (model MCTM-200 manufactured by Shimadzu Corporation) to thereby deform the particle. Referring to FIG. 1, the displacement, starting from 0, is increased along curve A in accordance with the increase of the load.

Thereafter, the load is removed until a given load value (original load value) at a load removing rate which is the same as the above loading rate. The displacement is slowly reduced along curve B in accordance with the removal of the load.

Provided that $L_1$ represents the difference between the displacement at the original load value in the loading stage and the displacement at the reversal load value and that $L_2$ represents the difference between the displacement at the original load value in the loading stage and the displacement at the original load value in the load removing stage, the elastic recovery $R_r$ and compressive deformation of the sample are calculated by the formulae:

$$R_r = [(L_1 - L_2)/L_1] \times 100,$$

and $$C_r = (L_1/D) \times 100.$$

In the present invention, with respect to each of ten particles, the elastic recovery and compressive deformation are determined according to the above formulae under the assumption that the original load and reversal load values are 0.1 g and 1.0 g, respectively. The averages thereof are referred to as the average elastic recovery and the average compressive deformation of the fine particle.

Further, the load value which is exhibited when the load is applied over the above reversal load value and the particle is crashed is referred to as the compressive strength.

The average particle diameter of the organopolysiloxane fine particle of the present invention is in the range of 0.5 to 50 μm, preferably 1 to 20 μm. The average particle diameter of the organopolysiloxane fine particle is selected with taking into account the type of liquid crystal display, required thickness of liquid crystal layer and elastic properties. The average particle diameter is measured by observation of a scanning electron micrograph.

Furthermore, for the fine particle, it is preferred that the variation coefficient of particle diameter CV be 5% or less, especially in the range of 1 to 3%. When the particle diameter variation coefficient exceeds 5%, it may occur that the thickness of the liquid crystal layer cannot be maintained uniformly to thereby cause image shading, etc. This variation coefficient CV is calculated by the formula:

$CV$=(standard deviation of particle diameter ($\sigma$)/average particle diameter ($Dn$))×100 standard deviation of particle diameter ($\sigma$)=$n\Sigma|Di-Dn|/(n-1)\times Dn$ Di: diameter of each individual particle n: number of measured particles.

Still further, it is preferred that the aggregation ratio of the organopolysiloxane fine particle be 5% or less, especially 3% or less. The aggregation ratio is defined as the percentage of particle aggregates based on a total of 100 particles wherein each aggregate consisting of a plurality of particles is counted as one particle in the observation of scanning electron micrograph (SEM). When the aggregation ratio is greater than 5%, it may occur that uniform spreading is difficult to thereby lower the spreading efficiency with the result that the cell of uniform gap cannot be obtained.

Process for Producing Organopolysiloxane Fine Particle

A process for producing an organopolysiloxane fine particle according to the present invention will now be described.

The organopolysiloxane fine particle of the present invention can be produced by the following process.

(a) Step for Preparing Seed Particle Dispersion

In the present invention, first, a mixture of an organosilicon compound (a–1) of the formula $Si(OR^1)_4$ (1) and an organosilicon compound (a–2) of the formula $R'Si(OR^2)_3$ (2) is subjected to hydrolysis and condensation polymerization in a solvent of a mixture of water and an organic solvent to thereby obtain a dispersion of seed particles.

Conventional techniques can be employed in the preparation of such seed particles.

In the above formulae, each of $R^1$ and $R^2$ represents a hydrogen atom or an organic group having 1 to 10 carbon atoms selected from among an alkyl group, an alkoxyalkyl group and an acyl group. It is preferred that $R^1$ and $R^2$ represent the same group from the viewpoint of simultaneously hydrolyzing an organosilicon compound (a–1) and an organosilicon compound (a–2) in a solvent of a mixture of water and an organic solvent and performing a condensation polymerization of the hydrolyzate.

Further, in the above formula, R' represents a hydrocarbon group having 1 to 10 carbon atoms selected from among substituted or unsubstituted hydrocarbon groups.

Examples of suitable unsubstituted hydrocarbon groups include an alkyl group such as chain alkyl or cycloalkyl, an alkenyl group, an aralkyl group and an aryl group. The substituted hydrocarbon group is a group obtained by partly or entirely substituting hydrogen atoms of the hydrocarbon with nonhydrocarbon groups or elements other than hydrogen. Examples of suitable substituted hydrocarbon groups include $CH_2Cl$, $CH_2F$, chloromethyl, γ-methacryloxypropyl, γ-glycidoxypropyl, aminopropyl, 3,4-epoxycyclohexylethyl, γ-mercaptopropyl and trifluoropropyl groups.

Examples of the organosilicon compounds (a–1) include tetramethoxysilane, tetraethoxysilane, tetrapropoxysilane, tetramethylmethoxysilane, tetraethylethoxysilane and tetraacetoxysilane.

Examples of the organosilicon compounds (a–2) include methyltrimethoxysilane, methyltriethoxysilane, methyltriisopropoxysilane, methyltris(methoxyethoxy) silane, ethyltrimethoxysilane, vinyltrimethoxysilane, phenyltrimethoxysilane, γ-chloropropyltrimethoxysilane, γ-glycidoxypropyltrimethoxysilane, methyltriacetoxysilane and phenyltriacetoxysilane.

In the step (a), with respect to the mixing ratio of the organosilicon compounds (a–1) and organosilicon compounds (a–2), it is preferred that 0.1 to 3.0 mol of the organosilicon compounds (a–2) be mixed with 1 mol of the organosilicon compounds (a–1).

In the step (a), use is made of a solvent of a mixture of water and an organic solvent. It is preferred that 10 to 100 parts by weight of water be contained in 100 parts by weight of an organic solvent.

The organic solvent is not particularly limited as long as it is miscible with water. Examples of the organic solvent include alcohols, glycols, glycol ethers and ketones.

In the step (a), it is preferred that an alkali such as ammonia as a catalyst for hydrolysis of the organosilicon compound (a–1) and organosilicon compound (a–2) be added to the mixture of water and an organic solvent so that the solvent is held alkaline during the hydrolysis of the organosilicon compounds.

The organosilicon compound (a–1) and organosilicon compound (a–2) are simultaneously hydrolyzed in the solvent consisting of a mixture of water and an organic solvent, and the hydrolyzate undergoes copolycondensation so that seed particles are formed. These reactions are accelerated when the solvent consisting of a mixture of water and an organic solvent is held alkaline.

The reaction temperature is preferably in the range of about 10 to 20° C.

The concentration of seed particles of the resultant seed particle dispersion is preferably in the range of about 0.05 to 5% by weight in terms of $SiO_2$.

It is also preferred that the average diameter of the obtained seed particles be in the range of 0.05 to 2.0 μm.

(b) Step for Stabilizing Seed Particles

In the present invention, an alkali is added to the seed particle dispersion obtained in the step (a) to thereby stabilize the seed particles (herein, the dispersion of seed particles thus stabilized by the addition of an alkali may be referred to as "healed sol").

The thus-attained stabilization of the dispersion by the addition of an alkali enables preventing the deposition attributed to the aggregation of seed particles. When seed particles are aggregated, a hydrolyzate of organosilicon compound may adhere to the joining portion of the aggregated particles in the subsequent step (c) with the result that particles are grown from the joining portion. Thus, it may occur that particles of uniform diameter cannot be obtained.

Examples of the alkalis added for the stabilization of the dispersion include ammonia gas, aqueous ammonia, an alkali metal hydroxide such as sodium hydroxide, a quaternary ammonium salt and an amine. These can be used either individually or in combination. Further, an ultrasonic may be applied to the dispersion in order to stabilize the dispersion. Still further, the stabilized dispersion is preferably brought into contact with a cation exchange resin to thereby reduce the amount of alkali and ammonia. It is preferred that the amount of alkali be reduced so that the alkali concentration of finally obtained fine particles is 100 ppm or less, especially 50 ppm or less, and still especially 10 ppm or less.

(c) Step for Growing Seed Particles

An alkali and at least one organosilicon compound represented by the following formula (3) or (4), optionally together with an acetylacetonato chelate compound represented by the following formula (5), are added to the healed sol obtained in the above step (b), and a hydrolysis and condensation polymerization thereof are carried out. As a result, the seed particles are grown to thereby obtain a dispersion of spherical fine particle of arbitrary diameter.

$$R'Si(OR^2)_3 \qquad \text{Formula (3):}$$

wherein $R^2$ and R' are as defined in the above step a). The organosilicon compounds represented by this formula (3) are referred to as organosilicon compound (c-1) in the step (c).

 Formula (4):

wherein R' and R" may be identical with or different from each other and each represent a group having 1 to 10 carbon atoms selected from among substituted or unsubstituted hydrocarbon groups, and $R^3$ represents the same group as the above R(1). The organosilicon compounds represented by the formula (4) are referred to as organosilicon compound (c-2).

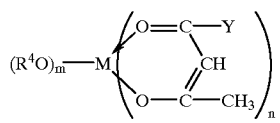 Formula (5):

wherein $R^4$ represents a propyl or butyl group; Y represents an organic group selected from among a methyl group, a methoxy group, an ethyl group and an ethoxy group; and M represents an element selected from among those of Groups 2 to 15 of the periodic table; and m is an integer of 0 to 3 and n is an integer of 1 to 4, provided that m+n is an integer of 2 to 4.

As the number of carbon atoms is increased with respect to R" of the organosilicon compound (c-2) and R' or the organosilicon compounds (c-1) and (c-2) used in the step (c), the seed particle dispersion is likely to gel, and growth of seed particles becomes difficult, at the time of addition of the organosilicon compound (c-1) and/or (c-2) to the seed particle dispersion.

Therefore, it is preferred that both R' and R" be groups with a small number of carbon atoms, such as methyl, vinyl, trifluoromethyl and phenylamino groups.

The organosilicon compound (a-2) used in the aforementioned step (a) can be used as the organosilicon compound (c-1).

Examples of the organosilicon compounds (c-2) include dimethyldimethoxysilane, dimethyldiethoxysilane, diethyldiethoxysilane, phenylmethyldimethoxysilane, γ-glycidoxypropylmethyldimethoxysilane and dimethylacetoxysilane.

Examples of the acetylacetonato chelate compounds represented by the above formula (5) include dibutoxy(bisacetylacetonato)zirconium, tributoxy(monoacetylacetonato)zirconium, triisopropoxy(monoacetylacetonato)titanium, dibutoxy(bisacetylacetonato)titanium, bisacetylacetonatolead, trisacetylacetonatoiron, dibutoxy(bisacetylacetonato/hafnium and tributoxy(monoacetylacetonato)hafnium.

In the step (c), although only the organosilicon compound (c-2) can be added to the seed particle dispersion, it is preferred that also at least about 50 mol % of the organosilicon compound (c-1) be added thereto.

Further, in the step (c), a small amount of the organosilicon compound represented by the formula $Si(OR^1)_4$ (1) may be added besides the above compounds (3) to (5).

At the time of adding the above compounds to the healed sol in the step (c), too rapid addition of the compounds may lead to the aggregation of seed particles in the healed sol or nonuniform growth of seed particles with the result that the organopolysiloxane fine particle having a sharp particle diameter distribution cannot be finally obtained. Therefore, it is preferred that the rate of addition of each of the compounds be regulated so as to fall within the range of 0.001 to 0.05 g/hr per g of water contained in the dispersion medium.

In the step (c) of the present invention, the above compounds are added while maintaining the pH of the seed particle dispersion at 6 to 9 to thereby grow the seed particles. When the pH of the dispersion is less than 6 or higher than 9, the spreadability of the obtained fine particle may be deteriorated.

Generally, an alkali such as ammonia is used in the regulation of the pH. In the present invention, in particular, it is preferred that the pH variation during the stage of seed particle growth fall in the range of ±30%, especially ±10%, based on the pH at the initiation of the addition of the compound. Therefore, it is preferred that, at the time of adding the above compounds to the seed particle dispersion, an aqueous alkali solution be added simultaneously and continuously.

When an alkali and at least one compound represented by the above formula (3) or (4), optionally together with the compound represented by the following formula (5), are added to the seed particle dispersion in the above manner, the compounds are hydrolyzed and the hydrolyzate or product of condensation polymerization of hydrolyzates undergoes condensation polymerization on the surface of seed particles to thereby effect lamination. Thus, the seed particles are grown.

The reaction temperature of the step (c) is lower than that of the above step (a) and is preferably in the range of about −10 to 20° C.

(d) Aging Step

The fine particle dispersion obtained in the above step (c) is heated at the same temperature as that of the step (c) or temperatures higher than the same so that the spherical fine particle is aged. This step renders the diameters of obtained fine particle more uniform. With respect to the aging temperature and time, it is preferred that the fine particle be maintained at about 20 to 90° C., especially 50 to 80° C., for about 0.5 to 24 hr.

When the aging temperature is lower than 20° C., it may occur that particles of minute diameters are newly formed, or silica components cannot be satisfactorily precipitated with the result that the amount of dissolved and remaining silica components is increased, thereby rendering it difficult to obtain monodispersed particles. On the other hand, when the aging temperature is higher than 90° C., aggregation of particles and formation of fused particles may occur.

The aged spherical fine particle is separated from the spherical fine particle dispersion by, for example, centrifugal separation and heated in a moist atmosphere.

(e) Step of Treating in Moist Atmosphere

The fine particle is heated at 100 to 600° C., preferably 150 to 500° C.

When the temperature is below 100° C., the elasticity of the fine particle may be lowered. On the other hand, when the temperature exceeds 600° C., the spreadability of the fine particle may be deteriorated.

Moist air and/or inert gas is used as the moist atmosphere. The moisture content in terms of relative humidity is preferably in the range of 20 to 90%, still preferably 50 to 80%.

In the treatment in the moist atmosphere, for promoting and completing the polycondensation of the organopolysiloxane contained in the spherical fine particle, the spherical fine particle may optionally be fired, or may be irradiated with ultraviolet or other electromagnetic wave.

Through the above steps (a) to (e), there can be produced the organopolysiloxane fine particle comprising as a principal component a polysiloxane having a hydrocarbon group (a) directly bonded to a silicon atom and having an OH group (b) directly bonded to a silicon atom, wherein:

(i) carbons contained in the hydrocarbon group (a) constitute 5 to 35% of the weight of the organopolysiloxane fine particle, and (ii) the OH group (b) is in an amount of 1 to 8 meq per g of the organopolysiloxane fine particle, the organopolysiloxane fine particle having:

(iii) a 10% compressive modulus of elasticity of 150 to 900 Kg/mm$^2$, (iv) an average compressive deformation $(C_r)^m$ of 20 to 60%, (v) an average elastic recovery $(R_r)^m$ of 60 to 90%, and (vi) an average particle diameter of 0.5 to 50 μm.

The above step (e) of treating in the moist atmosphere may be replaced by step (e') of heating in a nitrogenous basic gas atmosphere.

(e') Step of Treating in Nitrogenous Basic Gas Atmosphere

The nitrogenous basic gas is composed of, for example, ammonia, any of various ammonium salts, hydrogen azide, hydrazine, hydroxylamine, a hydroxylammonium salt or a nitrogenous hydrocarbon such as pyridine.

Air and/or inert gas containing the above nitrogenous basic gas is used as the nitrogenous basic gas atmosphere. The content of nitrogenous basic gas in the nitrogenous basic gas atmosphere is in the range of 10 to 100% by volume, preferably 50 to 100% by volume. Heating in the nitrogenous basic gas atmosphere enables obtaining the organopolysiloxane fine particle characterized by a small dispersion of 10% compressive modulus of elasticity.

The reason for the reduction of the dispersion of the compressive modulus of elasticity by the heating in the nitrogenous basic gas atmosphere, although not elucidated, would be that the dehydration reaction of silanol group is inhibited by the heating in the nitrogenous basic gas atmosphere to thereby prevent rapid dehydration reaction with the result that the strain generation and void formation within particles can be suppressed.

In the treatment in the nitrogenous basic gas atmosphere, the fine particle is heated at 100 to 600° C., preferably 150 to 500° C. When the temperature is below 100° C., the elasticity of the fine particle may be lowered. On the other hand, when the temperature exceeds 600° C., the spreadability of the fine particle may be deteriorated.

The above nitrogenous basic gas atmosphere may contain steam. The treatment in the nitrogenous basic gas atmosphere containing steam enables obtaining the fine particle whose spreadability is excellent.

In the hearing in the nitrogenous basic gas atmosphere, for promoting and completing the polycondensation of the organopolysiloxane contained in the spherical fine particle, the aged spherical fine particle may be subjected to calcination or irradiation with ultraviolet or other electromagnetic wave. This treatment may be performed in a nitrogenous basic gas or a gas containing a nitrogenous basic gas.

Through the above steps (a) to (e'), there can be produced the organopolysiloxane fine particle comprising as a principal component a polysiloxane having a hydrocarbon group (a) directly bonded to a silicon atom and having an OH group (b) directly bonded to a silicon atom, wherein:

(i) carbons contained in the hydrocarbon group (a) constitute 5 to 35% of the weight of the organopolysiloxane fine particle, and (ii) the OH group (b) is in an amount of 1 to 8 meq per g of the organopolysiloxane fine particle, the organopolysiloxane fine particle having:

(iii) a 10% compressive modulus of elasticity of 150 to 900 Kg/mm$^2$, (iv) an average compressive deformation $(C_r)^m$ of 20 to 60%, (v) an average elastic recovery $(R_r)^m$ of 60 to 950%, (vi) an average particle diameter of 0.5 to 50 μm, and (vii) a statistical dispersion of the 10% compressive modulus of elasticity which is in the range of ±20% based on an average of the 10% compressive modulus of elasticity.

Liquid Crystal Display

The liquid crystal display of the present invention is described in detail below.

The liquid crystal display of the present invention comprises a liquid crystal cell fitted with a pair of electrodes between which the above organopolysiloxane fine particles are interposed as spacers.

The structure of this liquid crystal cell is the same as that of the common liquid crystal cell, except that the organopolysiloxane fine particles of the present invention are so interposed that the inter-electrode distance of the liquid crystal cell is held uniform thereby.

In the liquid crystal display of the present invention, the organopolysiloxane fine particles may be interposed as spacers between the electrodes of the liquid crystal cell in such a manner that the organopolysiloxane fine particles lie all over the surfaces of the electrodes. Alternatively, the organopolysiloxane fine particles may be mixed in adhesive layers applied to peripheral parts of the electrodes.

The use of the organopolysiloxane fine particles of the present invention as spacers between the electrodes of the liquid crystal cell enables not only decreasing the number of spread particles but also reducing the damaging of the electrode surfaces or protective films. Furthermore, the use of the organopolysiloxane fine particles of the present invention enables reducing not only the nonuniformalization of the thickness of the liquid crystal layer inside the liquid crystal cell which is attributed to the smallness of the compressive deformation of the spacer particles but also the cold bubbling which is attributed to the difference between the thermal expansion coefficients of the liquid crystal layer and spacer inside the liquid crystal cell.

When the organopolysiloxane fine particles of the present invention are used as a spacer between the electrodes of the liquid crystal cell, generally, the particle diameter and CV value of the organopolysiloxane fine particles are selected taking into account the required cell gap magnitude, uniformity, etc. In the use of the organopolysiloxane fine particles as inter-electrode spacers, the uniformity of particle diameter is especially important. It is preferred that the CV value as an index of uniformity of particle diamter be 5% or less, especially in the range of 1 to 3%.

In the fabrication of a liquid crystal display cell with the use of the organopolysiloxane fine particles of the present invention as an inter-electrode spacer, first, the organopolysiloxane fine particles are uniformly spread on one electrode surface (the surface of the protective film in case a protective film is formed on the electrode surface) according to the wet or dry method. Subsequently, counter electrode surface (the surface of the protective film in case a protective film is formed on the electrode surface) is superimposed on the organopolysiloxane fine particles spread on one electrode surface (the surface of the protective film in case a protective film is formed on the electrode surface). The resultant cell gap is charged with a liquid crystal material, and peripheral parts of the two electrode surfaces are stuck to each other and sealed with the use of a sealing resin. The organopolysiloxane fine particles of the present invention may be mixed in this sealing resin.

Alternatively, the liquid crystal cell for use in the liquid crystal display of the present invention can be fabricated in the following manner. First, the periphery, except for an injection port of liquid crystal material, of one electrode surface (the surface of the protective film in case a protective film is formed on the electrode surface) is coated with a sealing resin in which the organopolysiloxane fine particles of the present invention are mixed. Subsequently, a counter electrode surface (the surface of the protective film in case a protective film is formed on the electrode surface) is superimposed thereon. Thereafter, a liquid crystal material is injected through the injection port of liquid crystal material, and the injection port of liquid crystal material is sealed with the use of a sealing resin.

As apparent from the foregoing, the present invention provides the organopolysiloxane fine particle which exhibits a low aggregation and an extremely sharp particle size distribution and has high compressive modulus of elasticity, elastic recovery and compressive deformation, and whose compressive deformation dispersion is small.

These organopolysiloxane fine particles have not only hydrophobic groups but also hydrophilic groups so that, in particular, the organopolysiloxane fine particles can uniformly be dispersed in a solvent containing water or the like as well. Therefore, the organopolysiloxane fine particles have excellent spreadability.

Further, the organopolysiloxane fine particle has hydrophilic groups, so that the electrification of fine particles commonly experienced at the time of dry spreading can be suppressed. Therefore, the organopolysiloxane fine particle of the present invention is hard to stick to parts other than the electrode surface and protective film.

When the organopolysiloxane fine particles of the present invention are used as the inter-electrode spacer in the liquid crystal cell, not only is the particle size distribution of the fine particles sharp but also the statistical dispersion of the compressive modulus of elasticity is small, so that the thickness of the liquid crystal layer formed between the electrodes of the liquid crystal cell can be held uniform. Moreover, the compressive modulus of elasticity is so high that she number of spread particles per area can be reduced. Further, the elastic recovery and compressive deformation of the organopolysiloxane fine particles are so high that the occurrence of cold bubbling in the liquid crystal cell can be prevented and a high-performance liquid crystal display free from image shading, etc. can be provided.

The present invention will be further illustrated below with reference to the following Examples, which in no way limit the scope of the invention.

EXAMPLE 1

Preparation of Seed Particles 8 g of methyltrimethoxysilane and 8 g of tetramethoxysilane were dissolved in 350 g of ethanol to thereby obtain solution A. On the other hand, 6 g of pure water, 78 g of 28% aqueous ammonia and 350 g of ethanol were mixed together to thereby obtain solution B.

The solution A and the solution B were mixed together and agitated at 20° C. for 3 hr to thereby effect hydrolysis and condensation polymerization of the alkoxysilanes. Thus, a seed particle dispersion was obtained.

3.3 g of a 1% by weight aqueous solution of potassium hydroxide was added to the obtained seed particle dispersion to thereby effect stabilization of seed particles (conversion to healed so). The pH value of the dispersion was 12. The average particle size of the seed particles of the seed particle dispersion was measured by means of centrifugal particle size distribution tester (CAPA-500 manufactured by Horiba Seisakusho), and it was found to be 0.15 $\mu$m.

Growth of Seed Particles

The obtained seed particle dispersion was heated and concentrated until the weight thereof was reduced to 160 g. Thereafter, the amount of alkali and ammonia was reduced with the use of 10 cc of a cation exchange resin. 5000 g of pure water and 250 g of butanol were added to the seed particle dispersion. The thus diluted seed particle dispersion was cooled to 0° C., and, while maintaining this temperature, 500 g of methyltrimethoxysilane was dropped into the seed particle dispersion at an addition rate of 0.005 g/g of pure water per hr. Simultaneously with the addition of methyltrimethoxysilane, 0.028% aqueous ammonia was added at an addition rate of about 0.012 g/g of pure water per hr. While maintaining the pH of the seed particle dispersion at 8.5, hydrolysis and condensation polymerization of methyltrimethoxysilane were carried out on the seed particles so that the seed particles were grown.

The obtained dispersion was agitated at 20° C. for 2 hr, then heated to 80° C. and aged for 5 hr.

After the aging, the fine particles were separated from the dispersion. The separated fine particles were dried and heated at 250° C. while feeding air of 50% relative humidity.

With respect to the thus obtained organopolysiloxane fine particles (P-1), there were determined the amounts of OH group and carbon directly bonded to silicon, the average particle size, the CV value, the 10% compressive modulus of elasticity, the average elastic recovery $(R_r)^m$ and the average compressive deformation $(C_r)^m$.

The amount of OH group, as aforementioned, was determined by measuring the 100 to 350° C. weight loss in a differential thermal analysis and calculating from the weight loss. As a result, the amount of OH group was 6% by weight (5.3 meq/g) based on the fine particles.

The carbon amount, because accurate quantification thereof by measuring means such as chemical analysis was not feasible, was calculated from the amount of alkoxysilanes used in production in the following manner.

For example, in Example 1, with respect to alkoxysilanes, 8 g of methyltrimethoxysilane and 8 g of tetramethoxysilane were used in the stage of producing seed particles, and 500 g of methyltrimethoxysilane was used in the stage of particle growth. Therefore, the carbon amount can be calculated as follows:

(1) Carbon amount of hydrocarbon group directly bonded to silicon atom in seed particles:

8 g of $CH_3$—Si—$(OCH_3)_3$ is equivalent to 3.94 g in terms of $CH_3$—$SiO_{3/2}$, and the carbon amount is 3.94×12/(15+28+24)=0.71 g.

8 g of Si—$(OCH_3)_4$ is equivalent to 3.16 g of $SiO_2$, and the carbon amount is 0 g.

(2) Carbon amount of methyltrimethoxysilane used in the stage of particle growth:

500 g of $CH_3$—Si—$(OCH_3)_3$ is equivalent to 246.32 g in terms of $CH_3$—$SiO_{3/2}$, and the carbon amount is 246.32×12/(15+28+24)=44.11 g.

The total carbon amount is the sum of the carbon amount of seed particles and the carbon amount of methyltrimethoxysilane used in the growth, which is 0.71+44.11=44.82 g. The total carbon amount 17.7% by weight based on the total fine particle weight (3.94+3.16+246.32=253.42 g). Taking into account the above determined OH group content (4.8% by weight in terms of $H_2O$), the amount of carbons directly bonded to silicon in the fine particles is (1−0.048)×0.177= 0.169, i.e., 16.9% by weight.

Furthermore, the average particle size of the organopolysiloxane fine particles was determined by observation of a scanning electron micrograph. The CV value was calculated from the average particle size. The 10% compressive modulus of elasticity, average elastic recovery $(R_r)^m$ and average compressive deformation $(C_r)^m$ were determined by the aforementioned methods.

The results are given in Table 1.

EXAMPLE 2

Preparation of Seed Particles

The solution A and solution B prepared in Example 1 were mixed together and agitated at 25° C. for 3 hr to thereby effect hydrolysis and condensation polymerization of the alkoxysilanes. Thus, a seed particle dispersion was obtained. Further, to the obtained seed particle dispersion, 3.3 g of a 1% by weight aqueous solution of potassium hydroxide was added and an ultrasonic was applied for 10 min to thereby effect stabilization of the seed particles. The pH value of the dispersion was 12. The average particle size of the seed particles of the seed particle dispersion was measured by the centrifugal particle size distribution measuring method, and it was found to be 0.15 μm.

Growth of Seed Particles

The obtained seed particle dispersion was heated and concentrated until the weight thereof was reduced to 160 g. Thereafter, the amount of alkali and ammonia was reduced with the use of 10 cc of a cation exchange resin. 5000 g of pure water and 250 g of butanol were added to the seed particle dispersion. The thus diluted seed particle dispersion was cooled to 0° C., and, while maintaining this temperature, a solution consisting of a mixture of 400 g of methyltrimethoxysilane and 100 g of vinyltrimethoxysilane was dropped into the seed particle dispersion at an addition rate of 0.005 g/g of pure water per hr. During the period, 0.028% aqueous ammonia was added at an addition rate of about 0.012 g/g of pure water per hr so that the pH of the seed particle dispersion was maintained at 8.0 and that hydrolysis and condensation polymerization of methyltrimethoxysilane and vinyltrimethoxysilane were carried out on the seed particles to thereby effect growth of the seed particles.

The obtained dispersion was agitated at 20° C. for 2 hr, then heated to 80° C. and aged for 5 hr.

After the aging, the fine particles were separated from the dispersion. The separated fine particles were dried and heated at 220° C. while feeding air of 60% relative humidity.

With respect to the thus obtained organopolysiloxane fine particles (P-2), there were determined the carbon amount of hydrocarbon group directly bonded to silicon, the amount of OH group bonded to silicon, the average particle size, the CV value, the 10% compressive modulus of elasticity, the average elastic recovery $(R_r)^m$ and the average compressive deformation $(C_r)^m$.

The results are given in Table 1.

EXAMPLE 3

The fine particles obtained in the same manner as in Example 1 were separated from the fine particle dispersion. The separated fine particles were dried and heated at 400° C. while feeding air of 70% relative humidity. Thus, there were obtained organopolysiloxane fine particles.

With respect to the thus obtained organopolysiloxane fine particles (P-3), there were determined the carbon amount of hydrocarbon group directly bonded to silicon, the amount of OH group directly bonded to silicon, the average particle size, the CV value, the 10% compressive modulus of elasticity, the average elastic recovery $(R_r)^m$ and the average compressive deformation $(C_r)^m$.

The results are given in Table 1.

COMPARATIVE EXAMPLE 1

Preparation of Seed Particles 8 g of methyltrimethoxysilane and 8 g of tetramethoxysilane were dissolved in 350 g of ethanol to thereby obtain solution A. On the other hand, 6 g of pure water, 78 g of 28% aqueous ammonia and 350 g of ethanol were mixed together to thereby obtain solution B.

The solution A and the solution B were mixed together and agitated at 20° C. for 3 hr to thereby effect hydrolysis and condensation polymerization of the alkoxysilanes. Thus, a seed particle dispersion was obtained. The average particle size of the seed particles of the seed particle dispersion was measured by means of the centrifugal particle size distribution measuring method, and it was found to be 0.15 μm.

Growth of Seed Particles

The obtained seed particle dispersion was heated and concentrated until the weight thereof was reduced to 160 g. Thereafter, 5000 g of pure water and 250 g of butanol were added to the concentrated seed particle dispersion. 100 g of 0.28% aqueous ammonia was added to the thus diluted seed particle dispersion. The pH of the dispersion was 10.5. The seed particle dispersion after the addition of aqueous ammonia was cooled to −5° C. While maintaining this temperature, 500 g of methyltrimethoxysilane was dropped into the seed particle dispersion at an addition rate of 0.005 g/g of pure water per hr, so that hydrolysis and condensation polymerization of methyltrimethoxysilane were carried out on the seed particles to thereby grow the seed particles. The pH after the completion of dropping was 8.5.

The dispersion after the completion of dropping was heated to 60° C. and agitated for 5 hr while maintaining the temperature to thereby age the grown seed particles.

After the aging, the fine particles were separated from the dispersion. The separated fine particles were dried and heated at 300° C. in air.

With respect to the thus obtained organopolysiloxane fine particles (P-A), there were determined the carbon amount of hydrocarbon group directly bonded to silicon, the amount of OH group bonded to silicon, the average particle size, the CV value, the 10% compressive modulus of elasticity, the average elastic recovery $(R_r)^m$ and the average compressive deformation $(C_r)^m$. The results are given in Table 1.

COMPARATIVE EXAMPLE 2

Growth of Seed Particles

The seed particle dispersion obtained in Comparative Example 1 was heated and concentrated until the weight thereof was reduced to 160 g. Thereafter, 5000 g of pure water and 250 g of butanol were added to the concentrated seed particle dispersion. 10 g of 0.28% aqueous ammonia was added to the thus diluted seed particle dispersion. The pH of the dispersion was 13. The seed particle dispersion after the addition of aqueous ammonia was cooled to −5° C. While maintaining this temperature, a solution consisting of a mixture of 450 g of methyltrimethoxysilane and 50 g of dimethylmethoxysilane was dropped into the seed particle dispersion at an addition rate of 0.005 g/g of pure water per hr, so that hydrolysis and condensation polymerization o methyltrimethoxysilane and dimethylmethoxysilane were carried out on the seed particles to thereby grow the seed particles. The pH after the completion of dropping was 10.

The dispersion after the completion of dropping was heated to 60° C. and agitated for 5 hr while maintaining the temperature to thereby age the grown seed particles.

The resultant fine particles were separated from the dispersion. The separated fine particles were dried and heated at 300° C. in air.

With respect to the thus obtained organopolysiloxane fine particles (P-B), there were determined the carbon amount of hydrocarbon group directly bonded to silicon, the amount of OH group bonded to silicon, the average particle size, the CV value, the 10% compressive modulus of elasticity, the average elastic recovery $(R_r)^m$ and the average compressive deformation $(C_r)^m$.

The results are given in Table 1.

TABLE 1

|  | Exam. 1 | Exam. 2 | Exam. 3 | Comp. Ex 1 | Comp. Ex 2 |
|---|---|---|---|---|---|
| carbon amt. (wt. %) | 16.9 | 18.3 | 17.3 | 19.3 | 19.4 |
| amt. of OH group (meq/g) | 5.3 | 7.3 | 2.4 | 0.8 | 0.4 |
| 10% compressive modulus of elasticity (Kg/mm$^2$) | 270 | 205 | 450 | 390 | 340 |
| av. compressive deformation (%) | 36 | 40 | 25 | 27 | 32 |
| av. elastic recovery (%) | 75 | 72 | 81 | 78 | 83 |
| particle diam. (μm) | 7.2 | 7.6 | 7.2 | 7.4 | 6.8 |
| var. coefficient (%) | 1.5 | 1.8 | 1.5 | 2 | 2.3 |

EXAMPLE 4

Preparation of Seed Particles

The solution A and solution B prepared in Example 1 were mixed together and agitated at 20° C. for 3 hr to thereby effect hydrolysis and condensation polymerization of the alkoxysilanes. Further, 3.3 g of a 1% by weight aqueous solution of potassium hydroxide was added to thereby effect stabilization of the seed particles. The pH value of the dispersion was 12. The average particle size of the seed particles of the seed particle dispersion was measured by means of centrifugal particle size distribution tester (CAPA-500 manufactured by Horiba Seisakusho), and it was found to be 0.15 μm.

Growth of Seed Particles

The obtained seed particle dispersion was heated and concentrated until the weight thereof was reduced to 160 g. Thereafter, the amount of alkali and ammonia was reduced with the use of 10 cc of a cation exchange resin. 5000 g of pure water and 250 g of butanol were added to the seed particle dispersion after the reduction of the amount of alkali and ammonia. The thus diluted seed particle dispersion was cooled to 0° C., and, while maintaining this temperature, 500 g of methyltrimethoxysilane was dropped into the seed particle dispersion at an addition rate of 0.005 g/g of pure water per hr. During the period, simultaneously with the addition of methyltrimethoxysilane, 0.028% aqueous ammonia was added at an addition rate of about 0.012 g/g of pure water per hr so that the pH of the seed particle dispersion was maintained at 8.5 and that hydrolysis and condensation polymerization of methyltrimethoxysilane were carried out on the seed particles to thereby effect growth of the seed particles.

Thereafter, the dispersion was agitated at 20° C. for 2 hr, heated to 80° C. and aged for 5 hr.

After the aging, the fine particles were separated rom the dispersion. The separated fine particles were dried and heated at 300° C. while feeding a gas consisting of a mixture of ammonia gas and stream (60% by volume of ammonia and 40% by volume of steam).

With respect to the thus obtained organopolysiloxane fine particles (P-4), there were determined the amounts of OH group and carbon directly bonded to silicon, the average particle size, the CV value, the 10% compressive modulus of elasticity with its statistical dispersion, the average elastic recovery $(R_r)^m$ and the average compressive deformation $(C_r)^m$.

The results are given in Table 2.

COMPARATIVE EXAMPLE 3

The same procedure as in Example 4 was repeated except that, after the seed particle growth, aging, fine particle separation from the reaction mixture and drying, the heating at 300° C. was performed while feeding air in place of the gas of a mixture of ammonia and steam.

With respect to the thus obtained organopolysiloxane fine particles (P-C), there were determined the carbon amount of hydrocarbon group directly bonded to silicon, the amount of OH group bonded to silicon, the average particle sine, the CV value, the 10% compressive modulus of elasticity with its statistical dispersion, the average elastic recovery $(R_r)^m$ and the average compressive deformation $(C_r)^m$.

The results are given in Table 2.

EXAMPLE 5

Preparation of Seed Particles

The solution A and solution B prepared in Example 1 were mixed together and agitated at 25° C. for 3 hr to thereby effect hydrolysis and condensation polymerization of the alkoxysilanes. Thus, there was obtained a seed particle dispersion. Further, to the obtained seed particle dispersion, 3.3 g of a 1% by weight aqueous solution of potassium hydroxide was added and an ultrasonic was applied for 10 min to thereby effect stabilization of the seed particles. The pH value of the dispersion was 12. The average particle size of the seed particles of the seed particle dispersion was measured by the centrifugal particle size distribution measuring method, and it was found to be 0.15 μm.

Growth of Seed Particles

The obtained seed particle dispersion was heated and concentrated until the weight thereof was reduced to 160 g. Thereafter, the amount of alkali and ammonia was reduced with the use of 10 cc of a cation exchange resin. 5000 g of pure water and 250 g of butanol were added to the seed particle dispersion. The resultant seed particle dispersion was cooled to 0° C., and, while maintaining this temperature, a solution consisting of a mixture of 400 g of methyltrimethoxysilane and 100 g of vinyltrimethoxysilane was dropped into the seed particle dispersion at an addition rate of 0.005 g/g of pure water per hr. During the period, 0.028% aqueous ammonia was added at an addition rate of about 0.012 g/g of pure water per hr so that the pH of the seed particle dispersion was maintained at 10 and that hydrolysis and condensation polymerization of methyltrimethoxysilane and vinyltrimethoxysilane were carried out on the seed particles to thereby effect growth of the seed particles.

Thereafter, the dispersion was agitated at 20° C. for 2 hr, heated to 80° C. and aged for 5 hr.

After the aging, the fine particles were separated from the dispersion. The separated fine particles were dried and heated at 300° C. while feeding a gas consisting of a mixture of ammonia gas and steam (60% by volume of ammonia and 40% by volume of steam).

With respect to the thus obtained organopolysiloxane fine particles (P-5), there were determined the carbon amount of hydrocarbon group directly bonded to silicon, the amount of OH group bonded to silicon, the average particle size, the CV value, the 10% compressive modulus of elasticity with its statistical dispersion, the average elastic recovery $(R_r)^m$ and the average compressive deformation $(C_r)^m$.

The results are given in Table 2.

COMPARATIVE EXAMPLE 4

The same procedure as in Example 5 was repeated except that, after the seed particle growth, aging, fine particle separation from the reaction mixture and drying, the heating was performed at 400° C. while feeding air in place of the gas of a mixture of ammonia and steam.

With respect to the thus obtained organopolysiloxane fine particles (P-D), there were determined the amount of carbon directly bonded to silicon, the amount of OH group bonded to silicon, the average particle size, the CV value, the 10% compressive modulus of elasticity with its statistical dispersion, the compressive strength, the average elastic recovery $(R_r)^m$ and the average compressive deformation $(C_r)^m$.

The results are given in Table 2.

TABLE 2

|  | Exam. 4 | Comp. Ex 3 | Exam. 5 | Comp. Ex 4 |
|---|---|---|---|---|
| carbon amt. (wt. %) | 17.0 | 17.6 | 19.1 | 19.5 |
| amt. of OH group (meq/g) | 4.2 | 0.9 | 2.8 | 0.3 |
| 10% compressive modulus of elasticity (Kg/mm$^2$) | 330 | 380 | 480 | 620 |
| dispersion of 10% compressive modulus of elasticity (%) | 15 | 38 | 17 | 40 |
| av. compressive deformation (%) | 31 | 28.5 | 23.5 | 19.8 |
| av. elastic recovery (%) | 78 | 75 | 81 | 85 |
| particle diam. (μm) | 7.2 | 7.2 | 7.4 | 7.4 |
| var. coefficient (%) | 1.5 | 1.5 | 1.8 | 1.8 |

EXAMPLE 6

A pair of transparent substrates with transparent electrode for use in a liquid crystal cell of a liquid crystal display were provided. Each of the transparent substrates with transparent electrode comprised a glass plate and, superimposed on its one side in sequence, an ITO thin film as a transparent electrode and an alignment coating for aligning molecules of a liquid crystal compound contained in a liquid crystal material in a given direction.

Subsequently, the organopolysiloxane fine particles obtained in Example 1 were spread on the alignment coating of one of the transparent substrates with transparent electrode. The spreading was performed in the following manner. The organopolysiloxane fine particles obtained in Example 1 were dispersed, at a concentration of 1% by weight, in a solvent consisting of a mixture of 350 cc of pure water, 120 cc of isopropyl alcohol and 30 cc of ethyl alcohol under agitation while applying an ultrasonic thereto. Thus, a spread dispersion was obtained. This spread dispersion was spread by spraying through a spray nozzle of 0.5 mm diameter (Lumina PR-10) arranged at a distance of 70 cm from the alignment coating under a pressure of 3 Kg/cm$^2$.

The average particle spread density was 130 particles/mm$^2$, the maximum spread density 147 particles/mm$^2$, the minimum spread density 114 particles/mm$^2$, and the statistical dispersion 13%. In each plane on which the spread density was measured, no aggregate of a plurality of particles (adhering particles) was observed. The spread density was measured by means of liquid crystal spacer counter (model ED-7510 manufactured by Edec Co., Ltd.) in the following manner. Specifically, 10 virtual longitudinal lines and 10 virtual lateral lines were provided with equal intervals on the spread surface, and the spread density was measured at 100 intersections. The average particle spread density was an average of the measured spread density values. The statistical dispersion of spread density was calculated from the above average particle spread density.

Then, the pair of transparent substrates with transparent electrode were piled one upon the other so that the alignment coating of the counter transparent substrate with transparent electrode was brought into contact with the spread organopolysiloxane fine particles.

The gap between the alignment coatings of the thus formed assembly of the pair of transparent substrates with transparent electrode was charged with a liquid crystal material. Peripheral parts of the substrates were stuck to each other and sealed with the use of a sealing resin to thereby obtain a liquid crystal cell. The obtained liquid crystal cell was arranged so as to be driven in STN mode.

The thus obtained liquid crystal cell was subjected to ten cycles of cooling from room temperature to −40° C. At each cycle, observation was conducted for any bubbling at −40° C. No cold bubbling was observed inside the liquid crystal cell.

The thus obtained liquid crystal cell was mounted on a liquid crystal display, and the liquid crystal display was driven. No shading of display image was observed.

EXAMPLE 7

The same procedure as in Example 6 was repeated except that the organopolysiloxane fine particles obtained in Example 2 were spread on the alignment coating of one of the transparent substrates with transparent electrode.

The average particle spread density was 125 particles/mm$^2$, the maximum spread density 135 particles/mm$^2$, the minimum spread density 114 particles/mm$^2$, and the statistical dispersion 9%. In each plane on which the spread density was measured, no aggregate of a plurality of particles (adhering particles) was observed.

Then, the pair of transparent substrates with transparent electrode were piled one upon the other so that the alignment coating of the counter transparent substrate with transparent electrode was brought into contact with the spread organopolysiloxane fine particles. The thus obtained liquid crystal cell was subjected to ten cycles of cooling from room temperature to −40° C. At each cycle, observation was conducted for any bubbling at −40° C. No cold bubbling was observed inside the liquid crystal cell.

The thus obtained liquid crystal cell was mounted on a liquid crystal display, and the liquid crystal display was driven. No shading of display image was observed.

EXAMPLE 8

The same procedure as in Example 6 was repeated except that the organopolysiloxane fine particles obtained in Example 3 were spread on the alignment coating of one of the transparent substrates with transparent electrode.

The average particle spread density was 123 particles/mm$^2$, the maximum spread density 143 particles/mm$^2$, the minimum spread density 105 particles/mm$^2$, and the statistical dispersion 16%. In each plane on which the spread density was measured, no aggregate of a plurality of particles (adhering particles) was observed.

Then, the pair of transparent substrates with transparent electrode were piled one upon the other so that the alignment coating of the counter transparent substrate with transparent electrode was brought into contact with the spread organopolysiloxane fine particles. The thus obtained liquid crystal cell was subjected to ten cycles of cooling from room temperature to −40° C. At each cycle, observation was conducted for any bubbling at −40° C. No cold bubbling was observed inside the liquid crystal cell.

The thus obtained liquid crystal cell was mounted on a liquid crystal display, and the liquid crystal display was driven. No shading of display image was observed.

COMPARATIVE EXAMPLE 5

The same procedure as in Example 6 was repeated except that the organopolysiloxane fine particles obtained in Comparative Example 1 were spread on the alignment coating of one of the transparent substrates with transparent electrode.

The average particle spread density was 128 particles/mm$^2$, the maximum spread density 173 particles/mm$^2$, the minimum spread density 90 particles/mm$^2$, and the statistical dispersion 36%. In each plane on which the spread density was measured, there were aggregates of a plurality of particles.

Then, the pair of transparent substrates with transparent electrode were piled one upon the other so that the alignment coating of the counter transparent substrate with transparent electrode was brought into contact with the spread organopolysiloxane fine particles. The thus obtained liquid crystal cell was subjected to ten cycles of cooling from room temperature to −40° C. At each cycle, observation was conducted for any bubbling at −40° C. Cold bubbling was observed inside the liquid crystal cell at the 8th and subsequent cooling cycles.

The thus obtained liquid crystal cell was mounted on a liquid crystal display, and the liquid crystal display was driven. Shading of display image was observed.

COMPARATIVE EXAMPLE 6

The same procedure as in Example 6 was repeated except that the organopolysiloxane fine particles obtained in Comparative Example 2 were spread on the alignment coating of one of the transparent substrates with transparent electrode.

The average particle spread density was 120 particles/mm$^2$, the maximum spread density 166 particles/mm$^2$, the minimum spread density 78 particles/mm$^2$, and the statistical dispersion 38%. In each plane on which the spread density was measured, there were aggregates of a plurality of particles.

Then, the pair of transparent substrates with transparent electrode were piled one upon the other so that the alignment coating of the counter transparent substrate with transparent electrode was brought into contact with the spread organopolysiloxane fine particles. The thus obtained liquid crystal cell was subjected to ten cycles of cooling from room temperature to −40° C. At each cycle, observation was conducted for any bubbling at −40° C. Cold bubbling was observed inside the liquid crystal cell at the 5th and subsequent cooling cycles.

The thus obtained liquid crystal cell was mounted on a liquid crystal display, and the liquid crystal display was driven. Shading of display image was observed.

EXAMPLE 9

The same procedure as in Example 6 was repeated except that the organopolysiloxane fine particles obtained in Example 4 were spread on the alignment coating of one of the transparent substrates with transparent electrode.

The average particle spread density was 124 particles/mm$^2$, the maximum spread density 144 particles/mm$^2$, the minimum spread density 107 particles/mm$^2$, and the statistical dispersion 16%. In each plane on which the spread density was measured, no aggregate of a plurality of particles (adhering particles) was observed.

Then, the pair of transparent substrates with transparent electrode were piled one upon the other so that the alignment coating of the counter transparent substrate with transparent electrode was brought into contact with the spread organopolysiloxane fine particles.

The gap between the alignment coatings of the thus formed assembly of the pair of transparent substrates with transparent electrode was charged with a liquid crystal material. Peripheral parts of the substrates were stuck to each other and sealed with the use of a sealing resin to thereby obtain a liquid crystal cell. The obtained liquid crystal cell was arranged so as to be driven in STN mode.

The thus obtained liquid crystal cell was subjected to ten cycles of cooling from room temperature to −40° C. At each cycle, observation was conducted for any bubbling at −40° C. No cold bubbling was observed inside the liquid crystal cell.

The thus obtained liquid crystal cell was mounted on a liquid crystal display, and the liquid crystal display was driven. No shading of display image was observed.

EXAMPLE 10

The same procedure as in Example 6 was repeated except that the organopolysiloxane fine particles obtained in Example 5 were spread on the alignment coating of one of the transparent substrates with transparent electrode.

The average particle spread density was 126 particles/$mm^2$, the maximum spread density 151 particles/$mm^2$, the minimum spread density 98 particles/$mm^2$, and the statistical dispersion 22%. In each plane on which the spread density was measured, no aggregate of a plurality of particles (adhering particles) was observed.

Then, in the same manner as in Example 6, the pair of transparent substrates with transparent electrode were piled one upon the other so that the alignment coating of the counter transparent substrate with transparent electrode was brought into contact with the spread organopolysiloxane fine particles. The thus obtained liquid crystal cell was subjected to ten cycles of cooling from room temperature to −40° C. At each cycle, observation was conducted for any bubbling at −40° C. No cold bubbling was observed inside the liquid crystal cell.

The thus obtained liquid crystal cell was mounted on a liquid crystal display, and the liquid crystal display was driven. No shading of display image was observed.

COMPARATIVE EXAMPLE 7

The same procedure as in Example 6 was repeated except that the organopolysiloxane fine particles obtained in Comparative Example 3 were spread on the alignment coating of one of the transparent substrates with transparent electrode.

The average particle spread density was 121 particles/$mm^2$, the maximum spread density 161 particles/$mm^2$, the minimum spread density 79 particles/$mm^2$, and the statistical dispersion 35%. In planes on which the spread density was measured, there were aggregates of a plurality of particles.

Then, in the same manner as in Example 6, the pair of transparent substrates with transparent electrode were piled one upon the other so that the alignment coating of the counter transparent substrate with transparent electrode was brought into contact with the spread organopolysiloxane fine particles. The thus obtained liquid crystal cell was subjected to ten cycles of cooling from room temperature to −40° C. At each cycle, observation was conducted for any bubbling at −40° C. Cold bubbling was observed inside the liquid crystal cell at the 8th and subsequent cooling cycles. Also, shading of display image was observed.

COMPARATIVE EXAMPLE 8

The same procedure as in Example 6 was repeated except that the organopolysiloxane fine particles obtained in Comparative Example 4 were spread on the alignment coating of one of the transparent substrates with transparent electrode.

The average particle spread density was 123 particles/$mm^2$, the maximum spread density 175 particles/$mm^2$, the minimum spread density 74 particles/$mm^2$, and the statistical dispersion 42%. In planes on which the spread density was measured, there were aggregates of a plurality of particles.

Then, in the same manner as in Example 6, the pair of transparent substrates with transparent electrode were piled one upon the other so that the alignment coating of the counter transparent substrate with transparent electrode was brought into contact with the spread organopolysiloxane fine particles. The thus obtained liquid crystal cell was subjected to ten cycles of cooling from room temperature to −40° C. At each cycle, observation was conducted for any bubbling at −40° C. Cold bubbling was observed inside the liquid crystal cell at the 1st and subsequent cooling cycles. Also, shading of display image was observed.

What is claimed is:

1. An organopolysiloxane fine particle comprising as a principal component a polysiloxane having a hydrocarbon group (a) directly bonded to a silicon atom and having an OH group (b) directly bonded to a silicon atom, wherein:

(i) carbon contained in the hydrocarbon group (a) constitute 5 to 35% of the weight of the organopolysiloxane fine particles, and (ii) the OH group (b) is in an amount of 1 to 8 meq per g of the organopolysiloxane fine particle, said organopolysiloxane fine particle having:

(iii) a 10% compressive modulus of elasticity of 150 to 900 Kg/$mm^2$, (iv) an average compressive deformation $(C_r)^m$ of 20 to 60%, (v) an average elastic recovery $(R_r)^m$ of 60 to 90%, and (vi) an average particle diameter of 0.5 to 50 $\mu$m.

2. The organopolysiloxane fine particle as claimed in claim 1, wherein the 10% compressive modulus of elasticity of the organopolysiloxane fine particles has a statistical dispersion falling in the range of ±20% based on an average of the 10% compressive modulus of elasticity.

3. A process for producing an organopolysiloxane fine particle, comprising the steps of:

(a) subjecting a mixture of an organosilicon compound of the formula $Si(OR^1)_4$ (1) and an organosilicon compound of the formula $R'Si(OR^2)_3$ (2) to hydrolysis and condensation polymerization in a solvent of a mixture of water and an organic solvent to thereby obtain a dispersion of seed particles, provided that, in the formulae, each of $R^1$ and $R^2$ represents a hydrogen atom or an organic group having 1 to 10 carbon atoms selected from among an alkyl group, an alkoxyalkyl group and an acyl group, and R' represents an organic group having 1 to 10 carbon atoms selected from among substituted or unsubstituted hydrocarbon groups;

(b) adding an alkali to the dispersion of seed particles to thereby stabilize the seed particle dispersion;

(c) adding at least one compound represented by the following formula (3) or (4), optionally together with a compound represented by the following formula (5) while maintaining the seed particle dispersion at a pH of 6 to 9, to the seed particle dispersion and performing a hydrolysis and condensation polymerization thereof so that the seed particles are grown to thereby obtain a spherical fine particle dispersion, R'Si(OR$^2$)$_3$ (3)

R'R"Si(OR$^3$)$_2$, and (4)

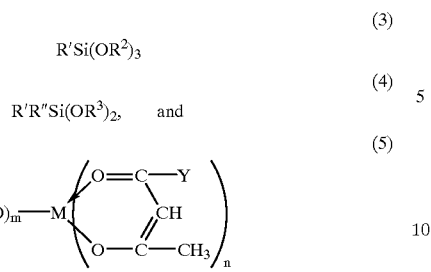
(5)

wherein:

R$^2$ and R' are as defined above, R" represents an organic group having 1 to 10 carbon atoms selected from among substituted or unsubstituted hydrocarbon groups, R$^3$ represents a hydrogen atom or an organic group having 1 to 10 carbon atoms selected from among an alkyl group, an alkoxyalkyl group and an acyl group, and R$^4$ represents a propyl or butyl group, Y represents an organic group selected from among a methyl group, a methoxy group, an ethyl group and an ethoxy group, and M represents an element selected from among those of Groups 2 to 15 of the periodic table, and m is an integer of 0 to 3 and n is an integer of 1 to 4, provided that m+n is an integer of 2 to 4;

(d) heating the spherical fine particle dispersion to thereby effect aging thereof; and (e) treating the spherical fine particle in a moist atmosphere at 100 to 600° C.

4. A process for producing an organopolysiloxane fine particle, comprising the steps of:

(a) subjecting a mixture of an organosilicon compound of the formula Si(OR$^1$)$_4$ (1) and an organosilicon compound of the formula R'Si(OR$^2$)$_3$ (2) to hydrolysis and condensation polymerization in a solvent of a mixture of water and an organic solvent to thereby obtain a dispersion of seed particles, provided that, in the formulae, each of R$^1$ and R$^2$ represents a hydrogen atom or an organic group having 1 to 10 carbon atoms selected from among an alkyl group, an alkoxyalkyl group and an acyl group, and R' represents an organic group having 1 to 10 carbon atoms selected from among substituted or unsubstituted hydrocarbon groups;

(b) adding an alkali to the dispersion of seed particles to thereby stabilize the seed particle dispersion;

(c) adding at least one compound represented by the following formula (3) or (4), optionally together with a compound represented by the following formula (5) while maintaining the seed particle dispersion at a pH of 6 to 13, to the seed particle dispersion and performing a hydrolysis and condensation polymerization thereof so that the seed particles are grown to thereby obtain a spherical fine particle dispersion, R'Si(OR$^2$)$_3$ (3)

R'R"Si(OR$^3$)$_2$, and (4)

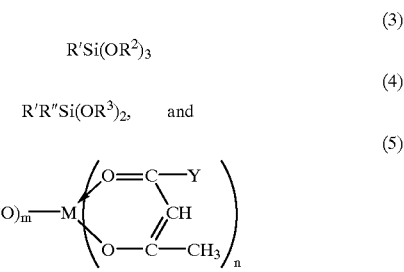
(5)

wherein:

R$^2$ and R' are as defined above, R" represents an organic group having 1 to 10 carbon atoms selected from among substituted or unsubstituted hydrocarbon groups, R$^3$ represents a hydrogen atom or an organic group having 1 to 10 carbon atoms selected from among an alkyl group, an alkoxyalkyl group and an acyl group, and R$^4$ represents a propyl or butyl group, Y represents an organic group selected from among a methyl group, a methoxy group, an ethyl group and an ethoxy group, and M represents an element selected from among those of Groups 2 to 15 of the periodic table, and m is an integer of 0 to 3 and n is an integer of 1 to 4, provided that m+n is an integer of 2 to 4;

(d) heating the spherical fine particle dispersion to thereby effect aging thereof; and (e') heating the spherical fine particle in a nitrogenous basic gas atmosphere.

5. The process as claimed in claim 3, wherein the produced organopolysiloxane fine particle has:

(i) a 10% compressive modulus of elasticity of 150 to 900 Kg/mm$^2$, (ii) an average compressive deformation $(C_r)^m$ of 20 to 60%, (iii) an average elastic recovery $(R_r)^m$ of 60 to 90%, and (iv) an average particle diameter of 0.5 to 50 μm.

6. The process as claimed in claim 4, wherein the produced organopolysiloxane fine particle has a 10% compressive modulus of elasticity of 150 to 900 Kg/mm$^2$ having a statistical dispersion falling in the range of ±20% based on an average of the 10% compressive modulus of elasticity.

7. A liquid crystal display comprising a liquid crystal cell fitted with a pair of electrodes between which the organopolysiloxane fine particles claimed in claim 1 are interposed as spacers.

8. A liquid crystal display comprising a liquid crystal cell fitted with a pair of electrodes between which the organopolysiloxane fine particles claimed in claim 2 are interposed as spacers.

* * * * *

UNITED STATES PATENT AND TRADEMARK OFFICE
CERTIFICATE OF CORRECTION

PATENT NO.     : 6,359,667 B1
DATED          : March 19, 2002
INVENTOR(S)    : Tsuguo Koyanagi et al.

It is certified that error appears in the above-identified patent and that said Letters Patent is hereby corrected as shown below:

Column 2,
Line 25, "fine particle" should read -- fine particles --.

Column 6,
Line 10, "hydrocarbon group" should read -- hydrocarbon groups --.

Column 14,
Line 15, "950%" should read -- 90% --.

Column 15,
Line 54, "she number" should read -- the number --.

Column 16,
Line 11, "healed so" should read -- healed sol --.

Column 19,
Line 15, "polymerization o" should read -- polymerization of --.

Column 20,
Line 23, "rom the" should read -- from the --.
Line 26, "gas and stream" should read -- gas and steam --.
Line 47, "particle sine" should read -- paritcle size --.

Signed and Sealed this

Eighteenth Day of June, 2002

Attest:

JAMES E. ROGAN
Attesting Officer      *Director of the United States Patent and Trademark Office*